US012653330B2

(12) United States Patent
Goppion

(10) Patent No.: US 12,653,330 B2
(45) Date of Patent: Jun. 16, 2026

(54) METHOD FOR IMPROVING BEHAVIOUR OF A MUSEUM DISPLAY CASE WITH RESPECT TO OBJECTS EXHIBITED THEREIN

(71) Applicant: GOPPION S.P.A., Trezzano sul Naviglio (IT)

(72) Inventor: Alessandro Goppion, Milan (IT)

(73) Assignee: GOPPION S.P.A., Trezzano sul Naviglio (IT)

( * ) Notice: Subject to any disclaimer, the term of this patent is extended or adjusted under 35 U.S.C. 154(b) by 353 days.

(21) Appl. No.: 17/657,451

(22) Filed: Mar. 31, 2022

(65) Prior Publication Data

US 2023/0255364 A1 Aug. 17, 2023

(30) Foreign Application Priority Data

Feb. 16, 2022 (IT) ......................... 102022000001865

(51) Int. Cl.
*A47F 3/04* (2006.01)
*C03B 32/00* (2006.01)
(52) U.S. Cl.
CPC ................ *A47F 3/04* (2013.01); *C03B 32/00* (2013.01)
(58) Field of Classification Search
None
See application file for complete search history.

(56) References Cited

U.S. PATENT DOCUMENTS

| | | | | |
|---|---|---|---|---|
| 3,372,204 A | * | 3/1968 | Stacey ................. | C07C 17/269 |
| | | | | 570/143 |
| 5,051,218 A | * | 9/1991 | Matthews ............. | B30B 11/001 |
| | | | | 419/10 |
| 5,228,894 A | * | 7/1993 | Sato ........................ | C03B 11/08 |
| | | | | 65/102 |
| 7,078,164 B1 | * | 7/2006 | Diamond .............. | C08F 110/14 |
| | | | | 422/62 |
| 2002/0132073 A1 | * | 9/2002 | Kumai .............. | H01L 21/67366 |
| | | | | 428/35.7 |

(Continued)

FOREIGN PATENT DOCUMENTS

| | | | | | |
|---|---|---|---|---|---|
| CA | 2448736 C | * | 8/2010 | ............. | B29C 39/34 |
| CN | 103535372 B | * | 2/2017 | | |

(Continued)

OTHER PUBLICATIONS

AIC news Jan. 2012, A New Strategy for Assessing Off-Gassing from Museum Materials: Air Sampling in Oddy Test Vessels (Year: 2012).*

(Continued)

*Primary Examiner* — Jodi C Franklin
(74) *Attorney, Agent, or Firm* — Steinfl + Bruno LLP

(57) ABSTRACT
In order to improve the behaviour of a museum display case towards objects exhibited therein, the display case is subjected to a heat treatment in which the museum display case is maintained at a treatment temperature for a treatment time. The treatment temperature is between 35° and 50° and the treatment time is at least 30 hours. In this way, the emission of harmful volatile substances, including VOCs (volatile organic compounds), is drastically reduced and consequently the objects displayed in the display case are not at risk of damages due to the presence of these volatile substances in the display case.

7 Claims, 1 Drawing Sheet

(56) References Cited

U.S. PATENT DOCUMENTS

| | | | | |
|---|---|---|---|---|
| 2006/0222723 | A1* | 10/2006 | Bevilacqua | A61P 25/20 424/769 |
| 2007/0084381 | A1* | 4/2007 | Sanbayashi | C09D 7/67 106/287.19 |
| 2008/0014111 | A1 | 1/2008 | Hedman | |
| 2014/0319979 | A1* | 10/2014 | Goppion | A47F 3/005 312/138.1 |
| 2014/0336826 | A1* | 11/2014 | Goppion | F24F 9/00 700/277 |
| 2015/0239767 | A1* | 8/2015 | Annamalai | C03B 32/00 65/355 |
| 2016/0029817 | A1* | 2/2016 | Goppion | A47F 3/12 312/140 |
| 2017/0236392 | A1* | 8/2017 | Goppion | G08B 13/14 340/568.8 |
| 2018/0329304 | A1* | 11/2018 | Huang | H01L 21/67109 |
| 2021/0320328 | A1* | 10/2021 | Visco | H01M 10/058 |

FOREIGN PATENT DOCUMENTS

| | | | | | |
|---|---|---|---|---|---|
| CN | 106471022 | A | * | 3/2017 | C08F 212/08 |
| CN | 107531544 | A | * | 1/2018 | A61J 1/05 |
| CN | 107955170 | A | * | 4/2018 | C08G 77/24 |
| DE | 3149845 | A1 | | 7/1983 | |
| DE | 4203800 | A1 | * | 8/1992 | B01D 53/261 |
| DE | 202021103858 | U1 | * | 9/2021 | |
| EP | 1535543 | A1 | | 6/2005 | |
| EP | 1994860 | A1 | * | 11/2008 | A47F 3/001 |
| EP | 3725188 | A1 | * | 10/2020 | A47F 3/005 |
| GB | 1262372 | A | | 2/1972 | |
| JP | 2019136298 | A | * | 8/2019 | |

OTHER PUBLICATIONS

Chiantore et al. Indoor Air Quality in Museum Display Cases: Volatile Emissions, Materials Contributions, Impacts 2021—concentration of VOCs in museum display cases (Year: 2021).*

Robinet et al. Journal of Non-crystalline solids 2009—removing organic pollutants (Year: 2009).*

Palomar le organic compounds (VOCs) in the alteration of historical unstable glasses (Year: 2022).*

Schieweck (Year: 2009).*

WD18 (Year: 2021).*

Museum_Display_Case_Expertise _DG_Display_Showcase. (Year: 2001).*

Showcases_a_really_effective_mean_for_protecting_artwork_Camuffo (Year: 1999).*

The_outgassing_characteristic_research_of_the_silicone_rubberinhigh-power_laser_system_Qipen (Year: 1995).*

WD18_Constant_Temperature_Showcase_For_Museum (Year: 2021).*

Wolfgang_The_Silicone_Conundrum_Part_II_Low_outgassing_Silicones_February_2011 (Year: 2011).*

Definition of volatile (Year: 2006).*

PE2E machine translation of Weintraub (DE 4331612). (Year: 1993).*

Salthammer, T. 2004 Emissions of Volatile Organic Compounds from Products and Materials in Indoor Environments, The Handbook of Environmental Chemistry 2004 (Year: 2004).*

International Search Report for Italian Application No. 10 202200001865 filed on Feb. 16, 2022; Mail Date: Sep. 28, 2022. 2 pages.

* cited by examiner

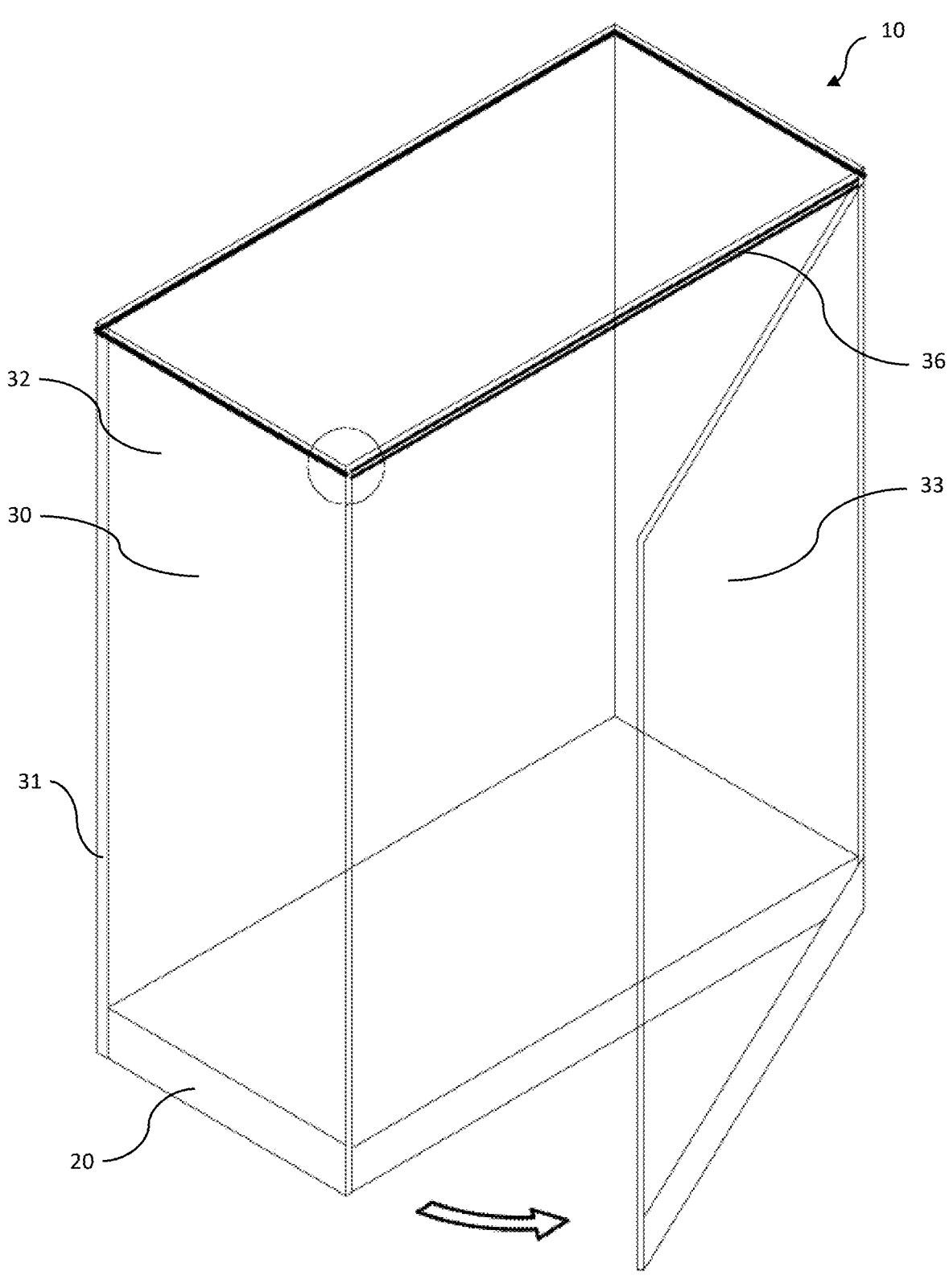

METHOD FOR IMPROVING BEHAVIOUR OF A MUSEUM DISPLAY CASE WITH RESPECT TO OBJECTS EXHIBITED THEREIN

CROSS REFERENCE TO RELATED APPLICATIONS

The present application claims priority to Italian Patent Application No. 102022000001865 filed on Feb. 16, 2022, the contents of which are incorporated herein by reference in their entirety.

FIELD

The present disclosure relates to museum display cases; in the following, the term display cases will sometimes be used for the sake of brevity, being it understood that reference is always made to museum display cases.

BACKGROUND

Museum display cases have to fulfil many requirements in order to guarantee both the correct protection and preservation of the objects exhibited therein and the best visibility of these objects for the public. Normally, these display cases comprise glass (or in any case transparent) walls assembled together and/or to a frame. Normally, one or more of the walls can be opened to allow access to the interior of the display case.

In many cases a museum display case has to guarantee a total separation between the exterior exhibition environment and the interior exhibition environment; this is the situation when the display case has to accommodate objects that would be damaged by external environmental conditions. In this case, the museum display case is provided to be airtight and to be equipped with a system to control the internal climatic and air quality conditions, in order to have in the interior exhibition environment a predefined controlled atmosphere that is suitable for the objects exhibited. To this end, the various parts of the display case are assembled by bonding with suitable adhesives and sealing gaskets are provided at the openable walls. The interior environment is thus separated from the exterior environment and can be adequately controlled, with more or less complex air conditioning and filtering systems.

SUMMARY

The inventor observed that the material of the adhesives, the material of the gaskets and the material of other parts used for the construction of the structure of the display case (e.g. painted parts) have often the tendency to emit volatile substances harmful to preservation, such as VOCs (volatile organic compounds). In fact, many materials, especially plastics or synthetics, retain more or less large quantities of solvents and volatile chemicals used for production and tend to release them over time; moreover, certain materials gradually transform over time and tend to release volatile substances. If the display case is airtight, the volatile substances emitted towards the interior thereof remain trapped inside the display case and normal filtering systems can hardly remove them. These volatile substances that are present inside the display case were recognised by the inventor as being responsible for possible unexpected deteriorations of the objects exhibited, despite the presence of accurate systems for the control of the internal atmosphere.

For the sake of best preservation, it is therefore appropriate to select the construction materials of the display case also on the basis of the emission power thereof, regardless of the performance of the filtering apparatus. However, making an airtight display case without using materials having the tendency to emit harmful volatile substances has proved to be substantially impossible. Above all, all materials that are sufficiently elastic to ensure the tightness of the openable parts, as well as all adhesive materials required to bond glass and metal materials together, and all paints used on glass or metal parts, have been shown to have the tendency to emit volatile substances.

The inventor then tried to expose the display case to air for a reasonably long degassing time, so as to allow the natural evacuation of volatile substances before using the display case. However, the results were not satisfactory, as these materials continue to emit volatile substances even after degassing, however long it may be.

The inventor therefore identified the problem of ensuring the correct preservation of the objects exhibited in a museum display case, even if the display case is made using materials that have the tendency to emit harmful volatile substances.

In accordance with various embodiments of the present disclosure, this problem is solved by a method for improving the behaviour of a museum display case towards objects exhibited therein, a method for manufacturing a museum display case, as well as a museum display case in accordance with the specification and claims of the application.

More particularly, a method for improving the behaviour of a museum display case with respect to objects exhibited therein, wherein the display case has parts facing an interior exhibition space which are made of materials having the tendency to emit harmful volatile substances, comprises the step of subjecting the display case to a heat treatment in which the display case is maintained at a treatment temperature for a treatment time, wherein the treatment temperature is between 35° and 50° and the treatment time is at least 30 hours and preferably no more than 100 hours.

Still according to the invention, a method for manufacturing a museum display case comprises the steps of:
  setting up a display case structure using materials having a tendency to emit VOCs;
  subjecting the display case structure to a heat treatment in which the display case is maintained at a treatment temperature for a treatment time, wherein the treatment temperature is between 35° and 50° and the treatment time is at least 30 hours.

Such heat treatment allows accelerating the release of harmful volatile substances from the materials having the tendency to emit them that have been used for the creation of the display case. After such heat treatment, these materials no longer emit harmful volatile substances in significant quantities; consequently, the display case can be used to exhibit relatively delicate objects.

Preferably, the treatment temperature is between 35° and 45°. Preferably, the treatment time is at least 35 hours. More preferably, the treatment time is between 35 hours and 100 hours.

The present disclosure also relates to a museum display case comprising parts made of materials having a tendency to emit harmful volatile substances, which is characterised in that it has been subjected to a heat treatment such that said materials have disposed of harmful volatile substances in sufficient quantity so that, under the conditions of use of the display case, said materials no longer emit harmful volatile substances in a quantity which is dangerous for the objects exhibited in the display case.

In one embodiment, the heat treatment is performed by placing the assembled display case in a treatment chamber. This method ensures uniform treatment of all parts of the display case, but it requires a treatment chamber that is adequately larger than the display case, and is therefore rather expensive.

Preferably, according to an alternative embodiment method, the heat treatment is performed by placing heating members in the display case. In this way, the treatment is easier to implement. Its effectiveness is inevitably limited to the parts facing the interior of the display case, but it is precisely in these parts that it is important to dispose of harmful volatile substances: in fact, the emission of volatile substances outside the display case is not a problem, because these substances do not reach the objects exhibited.

Further features and advantages of the embodiments of the disclosure will best be seen from the following description of a display case according to the disclosure.

BRIEF DESCRIPTION OF THE FIGURE

FIG. 1 shows a museum display case in accordance with the present disclosure.

DETAILED DESCRIPTION

In the drawing of FIG. 1, a museum display case 10 is schematically shown, which comprises a base 20, surmounted by a box 30. In the box 30, there is the exhibition space of the display case 10, destined to accommodate the objects to be exhibited, while in the base 20 there is a technical space for housing the systems for the control of the atmosphere inside the box 30 (for example, a simple container with hygroscopic material or a more complex air conditioning and/or filtering system).

The box 30 comprises a frame 31, typically made of steel, aluminium or another metal material. The box 30 then comprises glass walls mounted on the frame 31, in particular fixed glass walls 32 and at least one openable glass wall 33. The fixed glass walls 32 are welded to each other, to the frame 31 and to the base 20 by bonding, using an adhesive substance (not highlighted in the FIGURE). The openable glass wall 33 is mounted on the frame 31 by means of an openable system, for example a hinge system (not visible in the FIGURE). It should be noted that the frame 31 may be eliminated, either completely or in part, leaving the fixed glass walls 32—suitably sized and welded together—with the function of load-bearing structure of the box 30; in this case, the openable glass wall 33 is mounted on one or more of the fixed glass walls 32.

The display case 10 further comprises sealing gaskets 36, both between the openable glass wall 33 and the fixed glass walls 32, or between the openable glass wall 33 and the base 20.

In the display case 10, the material of the sealing gaskets 36 has a tendency to emit harmful volatile substances, in particular VOCs. This material is for example a silicone rubber, another elastic material or plastoferrite; the latter material combines excellent elasticity with the possibility of being magnetized, so that the openable glass wall 33 can be closed by magnetic attraction.

The adhesive substance with which the fixed glass walls 32 are welded and sealed is also a material that has a tendency to emit harmful volatile substances.

The display case 10 may further comprise other parts (e.g. accessories of various kinds, not shown in the FIGURE, such as partitions, support shelves, lighting fixtures, etc.) made of materials having a tendency to emit harmful volatile substances such as VOCs or other, or painted with paints that can emit such substances.

The display case 10 is assembled in a normal way, assembling the various parts as required. Once the assembly has been completed so as to obtain the structure of the display case, without however any hygroscopic material used for moisture control being housed in the base 20 of the display case 10, the display case 10 is subjected to a heat treatment to dispose of harmful volatile substances from the materials having a tendency to emit them.

For this purpose, the display case 10 may be placed in a treatment chamber, where it is maintained at a predefined treatment temperature for a predefined treatment time. It has been verified that if the treatment temperature is between 35° and 50°, the materials having a tendency to emit harmful volatile substances emit these substances in an accelerated manner, so that—if the treatment time is at least 30 hours—at the end of the heat treatment these materials have substantially exhausted the ability to emit harmful volatile substances, at least under the normal conditions of use of the display case 10. On the other hand, temperatures in this range are not such as to damage the parts of the display case.

Alternatively and preferably, heating members are placed inside the display case 10 so as to maintain the internal parts of the display case 10 at the predefined treatment temperature for the predefined treatment time. The heating members may act by convection, heating the air inside the display case 10, and/or by radiation; if the heating members act by radiation (or both by convection and radiation), they are placed so as to direct the radiation towards those parts of the display case 10 in which the materials having a tendency to emit VOCs or other harmful substances are located.

This method allows the display case 10 to be treated even at the installation site and is therefore preferred when the display case 10 (e.g. due to its large size) has to be assembled at the installation site.

During the heat treatment, by whichever method this is performed, a change of air is periodically performed in the interior exhibition space of the display case 10, for a duration of at least 5 minutes every hour.

Preferably, the treatment temperature is between 35° and 45°; even more preferably, it is around 40°. Preferably, the treatment time is at least 35 hours.

In order to verify the effective elimination or reduction of the harmful volatile substances, the concentration value of the harmful volatile substances in the air inside the display case 10 is measured during and at the end of the heat treatment using a per se known equipment.

Once the heat treatment has been completed, any hygroscopic material may be housed in the base 20 of the display case 10, in a manner known per se.

The display case 10 treated in this way can therefore be used safely, because the materials used therein which have a tendency to emit harmful volatile substances have exhausted their emission ability, or rather they have reduced it in such a way that they can still emit such substances, but only in a minimal quantity, such that it is not dangerous for the objects exhibited in the display case 10.

Depending on the intended use of the display case 10, i.e. depending on the ability of the objects exhibited to be damaged by VOCs or other volatile substances, it may be necessary to use higher or lower temperatures and treatment times to ensure that at the end of the heat treatment the display case 10 is completely safe, i.e. that the objects exhibited cannot be damaged.

The invention claimed is:

1. A method for improving behaviour of a museum display case with respect to objects to be exhibited therein, wherein the display case has parts facing an interior exhibition space which are made of materials capable of emitting volatile substances, the materials including at least one of: silicone rubber, elastic material, and plastoferrite, the method comprising the steps of:

assembling the display case by assembling various parts to obtain a structure of the display case;

after the assembling the display case and before exhibiting objects in the display case, subjecting the assembled display case to a heat treatment in which at least said materials including at least one of: silicone rubber, elastic material, and plastoferrite are subjected to a treatment temperature for a treatment time, wherein the treatment temperature is selected to accelerate release of volatile substances from said materials and the treatment time is at least 30 hours and not more than 100 hours, during which an air change is periodically performed in the interior exhibition space of the display case for a duration of at least 5 minutes every hour, and wherein the heat treatment is performed by placing heating members in the display case; and verifying elimination or reduction of volatile substances by measuring a concentration value of volatile substances in air inside the display case during and at the end of the heat treatment.

2. The method according to claim 1, wherein the treatment time is at least 35 hours.

3. The method according to claim 1, wherein the heating members heat the parts of the display case made of materials capable of emitting volatile substances by convection and/or radiation.

4. A method for manufacturing a museum display case comprising an interior exhibition space, comprising the steps of:

assembling a display case structure using, in parts of the display case facing the interior exhibition space, materials capable of emitting volatile substances, the materials including at least one of: silicone rubber, elastic material, and plastoferrite;

after the assembling the display case and before exhibiting objects in the display case, subjecting the assembled display case structure to a heat treatment in which at least said parts materials including at least one of: silicone rubber, elastic material, and plastoferrite are subjected to a treatment temperature for a treatment time, wherein the treatment temperature is selected to accelerate release of volatile substances from said materials and the treatment time is at least 30 hours and not more than 100 hours, during which an air change is periodically performed in the interior exhibition space of the display case for a duration of at least 5 minutes every hour, and wherein the heat treatment is performed by placing heating members in the display case; and verifying elimination or reduction of volatile substances by measuring a concentration value of volatile substances in air inside the display case during and at the end of the heat treatment.

5. The method according to claim 4, wherein the treatment time is at least 35 hours.

6. The method according to claim 4, wherein the heating members heat the parts of the display case by convection and/or radiation.

7. A method for improving behaviour of a museum display case with respect to objects to be exhibited therein, wherein the display case has parts facing an interior exhibition space which are made of materials capable of emitting volatile substances, the materials including at least one of: silicone rubber, elastic material, and plastoferrite, the method comprising the steps of:

assembling the display case by assembling various parts to obtain a structure of the display case, the structure comprising a base configured to house a hygroscopic material for moisture control;

after the assembling the display case and before exhibiting objects in the display case, and before housing the hygroscopic material in the base, subjecting the assembled display case to a heat treatment in which at least said materials including at least one of: silicone rubber, elastic material, and plastoferrite are subjected to a treatment temperature for a treatment time, wherein the treatment temperature is selected to accelerate release of volatile substances from said materials and the treatment time is at least 30 hours and not more than 100 hours, during which an air change is periodically performed in the interior exhibition space of the display case for a duration of at least 5 minutes every hour, and wherein the heat treatment is performed by placing heating members in the display case;

verifying elimination or reduction of volatile substances by measuring a concentration value of volatile substances in air inside the display case during and at the end of the heat treatment; and after the heat treatment is completed, housing the hygroscopic material in the base of the display case.

* * * * *